United States Patent
Joubert et al.

(10) Patent No.: US 8,287,509 B2
(45) Date of Patent: Oct. 16, 2012

(54) HYDROPHILIZED COMPOSITIONS COMPRISING NORMALLY HYDROPHOBIC THERMOPLASTIC POLYMERS/ANIONIC SURFACTANTS AND ARTICLES SHAPED THEREFROM

(75) Inventors: Daniel Joubert, Vineuil-Saint-Firmin (FR); Marc Balastre, Paris (FR); Antoine Guiu, Lyons (FR)

(73) Assignee: Rhodia Recherches et Technologies, Aubervilliers (FR)

( * ) Notice: Subject to any disclaimer, the term of this patent is extended or adjusted under 35 U.S.C. 154(b) by 883 days.

(21) Appl. No.: 11/886,304

(22) PCT Filed: Mar. 3, 2006

(86) PCT No.: PCT/FR2006/000479
§ 371 (c)(1),
(2), (4) Date: Nov. 17, 2008

(87) PCT Pub. No.: WO2006/097597
PCT Pub. Date: Sep. 21, 2006

(65) Prior Publication Data
US 2009/0105679 A1 Apr. 23, 2009

Related U.S. Application Data

(60) Provisional application No. 60/661,153, filed on Mar. 14, 2005.

(51) Int. Cl.
*A61F 13/49* (2006.01)
*C08G 63/91* (2006.01)
*B32B 27/36* (2006.01)

(52) U.S. Cl. ............ 604/385.01; 525/418; 525/55; 442/412; 442/301; 428/36.92

(58) Field of Classification Search .......... 604/385.01; 525/428, 55; 442/414, 301; 428/36.92
See application file for complete search history.

(56) References Cited

U.S. PATENT DOCUMENTS 3,637,900 A * 1/1972 Kimura et al. ............ 525/430

FOREIGN PATENT DOCUMENTS

| JP | 44-21656 Y | 9/1969 |
| JP | 8-157650 A | 6/1996 |
| JP | 11-269281 A | 10/1999 |

* cited by examiner

Primary Examiner — Robert D. Harlan
(74) Attorney, Agent, or Firm — SNR Denton US LLP

(57) ABSTRACT

Hydrophilized compositions including normally hydrophobic thermoplastic polymers, e.g., polypropylene, and hydrophilizing amounts of anionic surfactants, e.g., sodium alkylsulfonates, are shaped into such articles as molded objects having hydrophilic surfaces.

29 Claims, No Drawings

HYDROPHILIZED COMPOSITIONS COMPRISING NORMALLY HYDROPHOBIC THERMOPLASTIC POLYMERS/ANIONIC SURFACTANTS AND ARTICLES SHAPED THEREFROM

CROSS-REFERENCE TO PRIORITY APPLICATIONS

This application is the United States national phase of International Application No. PCT/FR 2006/000479, filed Mar. 3, 2006, published in French as International Publication No. WO 2006/097597 A1 on Sep. 21, 2006, and claims priority of U.S. Provisional Application No. 60/661,153, filed Mar. 14, 2005, each hereby expressly incorporated by reference in its entirety and each assigned to the assignee hereof.

The invention relates to a process for preparing thermoplastic polymers that makes it possible to obtain hydrophilic behavior of the surface of objects manufactured with these thermoplastic polymers.

It also relates to the additives used to obtain this surface hydrophilicity, said additives being mixed and co-melted with the thermoplastics (additivation in the bulk).

The molten blends of thermoplastic polymers and additives are shaped by any conventional means (extrusion, injection molding, film stretching, etc.) to obtain the desired objects.

The invention finally relates to applications of these objects made of thermoplastic polymers having hydrophilized surfaces.

Plastics such as polyesters, polyamides, polyolefins and more particularly polypropylene normally have very hydrophobic surfaces, which is a drawback for many applications of objects manufactured from these thermoplastics.

For example, porous or discontinuous voiles or films, manufactured from polypropylene or polyester yarns or fibers, obtained by the so-called nonwoven technique, that will be known here under the generic term "nonwoven textile surface", have an essentially hydrophobic surface behavior. This behavior requires that they are surface-coated, as a post-treatment, with soluble surfactant compositions in order to be able to be used in the applications such as hygiene, wiping, diaper, etc. applications.

This surface treatment has the disadvantage of not being durable and also of allowing the surfactant used in the treatment layer to dissolve when in contact with water. This point particularly has to be avoided in hygiene applications such as diapers.

Also, the hydrophilization of the surface of objects is desired in other applications, for example those concerning bulky objects such as parts for the automotive industry.

It is desired to be able to paint these parts, and the plastics such as polypropylene are not able to be painted. In this case, treatment of the surface with a coating of a hydrophilic or amphiphilic species is not a viable solution because the hydrophilizing treatment is neither durable nor adherent.

In another type of application, hydrophilicity is desired because it enables the surface in question to be cleaned with water. In particular, the containers for food use made of polyolefin (PE, PP) present a cleaning problem when it is desired to wash them in an automatic dishwasher. Whereas all the glass or ceramic utensils emerge clean and dry from the dishwasher, utensils made of polyolefins emerge still wet, with water droplets that are not spread out due to the high hydrophobicity of the utensils and containers in question.

Finally, the hydrophilicity of packaging or films made of polypropylene is also desired to prevent them from getting dirty, and prevent the deposit of dust, and condensation, during storage of products packaged in polypropylene films in retail outlets. At this level, the hydrophilicity contributes to the non-adhesion of greasing dirt or dust, but also to the flow of static electricity charges responsible for certain types of soiling.

There is a need to find a means of preparing a thermoplastic polymer which has a more hydrophilic surface.

One of the objects of the present invention is therefore to find a means of preparing a thermoplastic polymer which has a more hydrophilic surface.

This object, and others, is achieved by the present invention, one subject of which is therefore a composition comprising a thermoplastic polymer and a hydrophilizing agent chosen from anionic surfactants in the form of salts or in acid form.

It also relates to a process for preparing the thermoplastic polymer into which the hydrophilizing agent has been incorporated.

The invention finally relates to the applications of this thermoplastic polymer having a hydrophilized surface.

The expression "thermoplastic polymer" is understood to mean polyesters, polyamides and polyolefins such as polyethylene and polypropylene.

As anionic surfactants in the form of salts or in acid form, mention may be made of:

alkylsulfonic acids, arylsulfonic acids, optionally substituted by one or more hydrocarbon-based groups, and of which the acid function is partially or completely salified, such as $C_8$-$C_{50}$, more particularly $C_8$-$C_{30}$, preferably $C_{10}$-$C_{22}$ alkylsulfonic acids, benzenesulfonic acids, naphthalenesulfonic acids, substituted by one to three $C_1$-$C_{30}$, preferably $C_4$-$C_{16}$, alkyl groups and/or $C_2$-$C_{30}$, preferably $C_4$-$C_{16}$, alkenyl groups;

monoesters or diesters of alkylsulfosuccinic acids, of which the linear or branched alkyl part is optionally substituted by one or more hydroxylated and/or alkoxylated (preferably ethoxylated, propoxylated or ethopropoxylated) linear or branched $C_2$-$C_4$ groups;

phosphate esters chosen more particularly from those comprising at least one linear or branched, saturated, unsaturated or aromatic hydrocarbon-based group comprising 8 to 40, preferably 10 to 30, carbon atoms, optionally substituted by at least one alkoxylated (ethoxylated, propoxylated, ethopropoxylated) group. Moreover, they comprise at least one monoesterified or diesterified phosphate ester group so that it is possible to have one or two free, or partially or completely salified, acid groups. The preferred phosphate esters are of the type of monoesters and diesters of phosphoric acid and of alkoxylated (ethoxylated and/or propoxylated) mono-, di- or tristyrylphenol, or of alkoxylated (ethoxylated and/or propoxylated) mono-, di- or trialkylphenol, optionally substituted by one to four alkyl groups; of phosphoric acid and of an alkoxylated (ethoxylated or ethopropoxylated) $C_8$-$C_{30}$, preferably $C_{10}$-$C_{22}$, alcohol; of phosphoric acid and a non-alkoxylated $C_8$-$C_{22}$, preferably $C_{10}$-$C_{22}$, alcohol;

sulfate esters obtained from saturated or aromatic alcohols, optionally substituted by one or more alkoxylated (ethoxylated, propoxylated or ethopropoxylated) groups, and for which the sulfate functional groups are present in the free, or partially or completely neutralized, acid form. By way of example, mention may be made of the sulfate esters obtained more particularly from saturated or unsaturated $C_8$-$C_{20}$ alcohols, which may comprise 1 to 8 alkoxylated (ethoxylated, propoxylated, ethopropoxylated) units; the sulfate esters obtained from polyalkoxylated phenol, substituted by 1 to 3 saturated or unsaturated $C_2$-$C_{30}$ hydroxycarbon-based groups, and in which the number of alkoxylated units is between 2 and 40; the sulfate esters obtained from polyalkoxylated mono-, di- or tristyrylphenol in which the number of alkoxylated units varies from 2 to 40.

The anionic surfactants may be in acid form (they are potentially anionic), or in a partially or completely salified form, with a counterion. The counterion may be an alkali metal, such as sodium or potassium, an alkaline-earth metal, such as calcium, or else an ammonium ion of formula $N(R)_4^+$ in which the R groups, being identical or different, represent a hydrogen atom or a $C_1$-$C_4$ alkyl radical optionally substituted by an oxygen atom.

The anionic surfactants are preferably used in the form of sodium salts.

Even more preferably, the anionic surfactant is a sodium alkylsulfonate, of which the alkyl group is linear or branched, comprising on average from 6 to 30 carbon atoms. The anionic surfactant has the following formula:

$$CH_3-(CH_2)_n-CH_2-SO_3Na$$

in which n is an average number between 8 and 16.

One product which may be used is an anionic product sold by Rhodia under the name CATAFOR FL or CATAFOR AFL, in solid form.

The amount of hydrophilizing agent introduced into the polymer is such that the weight ratio between the hydrophilizing agent and the thermoplastic polymer is between 1/99 and 10/90.

The hydrophilizing agent is blended and co-melted with the thermoplastic polymer.

The thermoplastic polymer is generally present in the form of solid granules.

The hydrophilizing agent may be blended at room temperature with the polymer granules then introduced into a mixing device brought to temperature.

The hydrophilizing agent may also be introduced into the mixing device in which the polymer is already present in the melt state.

The mixing device at temperature may be a chamber equipped with rotors and heated by a flow of fluid. It is thus referred to as an internal mixer. This is a "batch" process. Mention may be made, for example, of a Brabender mixer. After cooling, a preform of solid material is recovered which can be formed in a mold by compression.

The mixing device at temperature may also be an extruder in which the material is conveyed, heated and kneaded by rotating screw components. This is a "continuous" process. Mention may be made, for example, of a Werner ZSK30 extruder. A rod of molten material is recovered which is cooled then cut to obtain granules.

These granules may then be injection-molded in the form of test pieces or finished materials.

When the hydrophilizing agent is in solid form, that is to say in the form of a powder, flakes or granules, it is then incorporated easily as indicated above.

When the hydrophilizing agent is in liquid form, 100% hydrophilizing agent or the hydrophilizing agent in solution in a solvent, there are several possibilities for the incorporation thereof.

It is possible to directly incorporate the liquid, with or without evaporation of the solvent according to whether the boiling point of the liquid (hydrophilizing agent or solvent) is below or above the conversion temperature (around 180° C.).

It is also possible to impregnate this liquid into a porous support, such as for example a precipitated silica in order to obtain a powder. This powder may then be shaped to facilitate its use.

Mention may be made, for example, of document FR 2 843 122 incorporated by reference which describes means for incorporating liquids into thermoplastic polymers.

Therefore, another subject of the present invention is a process for preparing a composition comprising the thermoplastic polymer and the hydrophilizing agent, characterized in that the hydrophilizing agent and the thermoplastic polymer are melt-blended.

Therefore, another subject of the present invention is a process for preparing a composition comprising the thermoplastic polymer and the hydrophilizing agent, characterized in that the hydrophilizing agent is blended with the thermoplastic polymer, optionally with other ingredients, for example fillers or stabilizers, by blending with the thermoplastic polymer before melting, by direct introduction into the molten thermoplastic polymer, and/or via a masterbatch.

The molten blends of thermoplastic polymer and hydrophilizing agent may be formed by any conventional means (extrusion, injection molding, film stretching, etc.) in order to obtain the desired objects.

The molten blends of thermoplastic polymer and hydrophilizing agent may thus be made into the form of a powder to be molded, in the form of an extruded and/or blow-molded and/or injection-molded object, in the form of a film, or in the form of fibers, yarns or filaments, optionally assembled as a woven or nonwoven textile surface.

The invention also relates to the applications of these objects made of thermoplastic polymers having hydrophilized surfaces.

As examples of objects made of thermoplastic polymer having a hydrophilized surface, mention may especially be made of a nonwoven textile surface comprising fibers based on a composition according to the invention.

Mention may be made, in particular, of a nonwoven textile surface comprising fibers based on a composition according to the invention in which the thermoplastic polymer is based on polypropylene.

This textile surface may be used in the manufacture of diapers for babies, a feminine hygiene product or a product for the treatment of adult incontinence.

As examples of objects made of a thermoplastic polymer having a hydrophilized surface, mention may also be made of bulky objects such as parts for the automotive industry.

As examples of objects made of a thermoplastic polymer having a hydrophilized surface, mention may also be made of containers for food use made of polyolefin (polyethylene or polypropylene).

As examples of objects made of a thermoplastic polymer having a hydrophilized surface, mention may also be made of packaging or films made from polypropylene.

The invention finally relates to the use of anionic surfactants in the form of salts or in acid form as defined previously as hydrophilizing agents for a composition comprising a thermoplastic polymer.

The surface hydrophilicity is evaluated by measurement of the contact angle between a drop of purified, distilled water and said surface. A drop of distilled water of calibrated size is deposited under standardized and repetitive conditions on the surface to be studied. It spreads out or retracts to a greater or lesser degree depending on the hydrophilicity of the surface, and with a suitable apparatus, it is possible to measure the angle formed by the deposited drop and the surface.

The apparatus used may be, for example, a goniometer for measuring the wetting angle, for example of the Tantec brand. It is also possible to use an automatic measurement device, such as the drop tensiometer with optical bench from IT Concept. This is the case for the measurements which were carried out in the examples given below. The experiment consists in depositing a drop of water of calibrated volume that is equal to two microliters onto the clean and smooth surface of the sample using a syringe. The drop is lit by a uniform light source, of integrated sphere type, the image of its profile is projected by a telecentric telephoto lens to a CCD camera. It is digitalized and then treated by software to determine, several times per second, the right and left contact angles defined as the angles between the plane formed by the support and the tangent planes on both sides of the base of the drop.

Typically, pure polypropylene has a contact angle with pure water of 105°.

The hydrophilizing agents, when they are blended with the thermoplastic polymer polypropylene make it possible to significantly reduce this value, to levels between 70 and 85°.

Other aspects and features of the products which are the subject of the invention will appear in the light of the examples which are given below by way of illustration and that are in no way limiting.

Except where indicated otherwise, all the percentages given in the present application are weight percentages.

EXAMPLE 1

Processing of These Products

The constituents (94.9% of isotactic polypropylene homopolymer as granules sold by ATOFINA under the name PPH4060, 5% of hydrophilizing agent and 0.1% of IRGANOX B225 heat stabilizer) were introduced into the chamber of a "Brabender" brand internal mixer raised to a temperature of 150° C.

The chamber was equipped with two counter-rotating rotors of W50 thermoplastic type, rotating at a speed of 125 rpm. Taking into account internal shearing, the final temperature of the mixture was between 180° C. and 190° C. After a mixing time of 5 minutes, a filled polymer preform was extracted from the chamber, and was pressed in a mold having a thickness of 800 μm, between two compression plates heated to 200° C. under 200 bar of pressure for 2 minutes. The mold was then cooled between two plates cooled to 18° C. under a pressure of 200 bar for 4 minutes.

After cooling and strengthening, these test pieces were the subject of various physicochemical tests intended to verify the hydrophilicity of their surface and the properties which result therefrom.
Remarks on the Processing and Effect of Additives on the Molten Blends:

Various physical effects were noted during the mixing in the Brabender kneader, which could bring significant advantages to this preparatory phase. For CATAFOR FL (or "AFL"), a lubricant effect was noted. The final product (test piece) had a modified feel, qualified as soft or silky.

EXAMPLE 2

Hydrophilizing Effects

They are given (via the measurement of the contact angle with distilled water) in Table I below, and as a function of the aging of the test pieces in the open air.

The measurements were carried out on the examples given below by using a drop tensiometer with optical bench known as SDT 200 from IT Concept.

The experiment consisted in depositing a drop of water of calibrated volume that was equal to two microliters onto the clean and smooth surface of the sample using a syringe. The drop was lit by a uniform light source, of integrated sphere type, the image of its profile was projected by a telecentric telephoto lens to a CCD camera. It was digitalized and then treated by software to determine, several times per second, the right and left contact angles defined as the angles between the plane formed by the support and the tangent planes on both sides of the base of the drop. The result indicated in Table I corresponds to the average of 10 to 15 measurements.

TABLE I

| Age of the test piece and treatment | Measurement at the time of mixing | Measurement at the end of one month in ambient air |
| --- | --- | --- |
| Reference PP without additive | 102 ± 2° | 105° ± 2° |
| PP + CATAFOR FL (or "AFL") | 91 ± 2° | 100° ± 2° |

PP signifies polypropylene.

The surface of the test pieces was cleaned with ethanol prior to the deposit of the drop for the contact angle measurement.

It is observed that the hydrophilicity of the surface is obtained in a durable manner.

The invention claimed is:

1. A hydrophilized composition comprising a normally hydrophobic thermoplastic polymer and an effective amount of a hydrophilizing agent therefor, said hydrophilizing agent comprising an anionic phosphate ester surfactant in the form of a salt or a free acid thereof.

2. The hydrophilized composition as defined by claim 1, said normally hydrophobic thermoplastic polymer comprising a polyester, a polyamide or a polyolefin.

3. The hydrophilized composition as defined by claim 2, said normally hydrophobic thermoplastic polymer comprising polyethylene or polypropylene.

4. The hydrophilized composition as defined by claim 3, said normally hydrophobic thermoplastic polymer comprising polypropylene.

5. The hydrophilized composition as defined by claim 1, wherein the weight ratio between said hydrophilizing agent and said normally hydrophobic thermoplastic polymer ranges from 1/99 to 10/90.

6. The hydrophilized composition as defined by claim 1, said normally hydrophobic thermoplastic polymer comprising solid granules thereof.

7. The hydrophilized composition as defined by 1, said anionic surfactant comprising a powder, flakes or granules thereof.

8. The hydrophilized composition as defined by claim 1, further comprising an effective amount of a heat stabilizer therefor.

9. The hydrophilized composition as defined by claim 1, said anionic surfactant comprising a solvent solution thereof.

10. The hydrophilized composition as defined by claim 1, comprising a melt-blend of said normally hydrophobic thermoplastic polymer and said anionic surfactant.

11. A shaped article having a hydrophilized surface and shaped from the hydrophilized composition as defined by claim 1.

12. The shaped article as defined by claim 11, comprising a fiber, yarn or filament.

13. The shaped article as defined by claim 11, comprising a woven or non-woven textile.

14. The shaped article as defined by claim 11, comprising a molded object.

15. The shaped article as defined by claim 11, comprising an extrudate.

16. The shaped article as defined by claim 11, comprising a film.

17. A baby diaper comprising a shaped article as defined by claim 11.

18. A feminine hygiene product comprising a shaped particle as defined by claim 11.

19. A product for the treatment of adult incontinence comprising a shaped article as defined by claim 11.

20. A food container comprising a shaped article as defined by claim 11.

21. The hydrophilized composition as defined by claim 1, comprising a masterbatch.

22. A process for the preparation of a hydrophilized composition as defined by claim 1, comprising introducing said anionic phosphate ester surfactant into a melt of said normally hydrophobic thermoplastic polymer.

23. A process for the preparation of a hydrophilized composition as defined by claim 1, comprising melting a blend of said normally hydrophobic thermoplastic polymer and said anionic phosphate ester surfactant.

24. The hydrophilized composition as defined by claim 1, wherein said anionic phosphate ester surfactant comprises:
- at least one linear or branched, saturated, unsaturated or aromatic hydrocarbon-based group comprising 8 to 40 carbon atoms, optionally substituted by one alkoxylated group; and
- at least one monoesterified or diesterified phosphate ester group, wherein said surfactant optionally comprises one or two acid groups and said acid group are free acids, or partially salified or completely salified.

25. The hydrophilized composition as defined by claim 24, wherein said anionic phosphate ester surfactant comprises a monoester or diester of phosphoric acid and
- an alkoxylated mono-, di-, or tri- styrylphenol; or
- an alkoxylated mono-, di-, or tri- alkylphenol.

26. The hydrophilized composition as defined by claim 24, wherein said anionic phosphate ester surfactant comprises an ester of phosphoric acid and an alkoxylated $C_8$-$C_{30}$ alcohol.

27. The hydrophilized composition as defined by claim 26, wherein said anionic phosphate ester surfactant comprises an ester of phosphoric acid and an alkoxylated $C_{10}$-$C_{22}$ alcohol.

28. The hydrophilized composition as defined by claim 24, wherein said anionic phosphate ester surfactant comprises an ester of phosphoric acid and a non-alkoxylated $C_8$-$C_{22}$ alcohol.

29. The hydrophilized composition defined by claim 28, wherein said anionic phosphate ester surfactant comprises an ester of phosphoric acid and a non-alkoxylated $C_{10}$-$C_{22}$ alcohol.

\* \* \* \* \*